United States Patent [19]
Lettau

[11] Patent Number: 4,735,769
[45] Date of Patent: Apr. 5, 1988

[54] NUCLEAR REACTOR FUEL ASSEMBLY

[75] Inventor: Hans Lettau, Effeltrich, Fed. Rep. of Germany

[73] Assignee: Kraftwerk Union Aktiengesellschaft, Mülheim, Fed. Rep. of Germany

[21] Appl. No.: 888,828

[22] Filed: Jul. 22, 1986

[30] Foreign Application Priority Data

Jul. 24, 1985 [DE] Fed. Rep. of Germany ....... 3526504

[51] Int. Cl.⁴ ............................................... G21C 3/34
[52] U.S. Cl. .................................... 376/441; 376/442; 376/438
[58] Field of Search ......................... 376/441, 442, 438

[56] References Cited

U.S. PATENT DOCUMENTS

| | | | |
|---|---|---|---|
| 3,457,140 | 7/1969 | Glandin | 376/442 |
| 4,190,494 | 2/1980 | Olsson | 376/442 |
| 4,568,512 | 2/1986 | Jolly | 376/438 |

FOREIGN PATENT DOCUMENTS

| | | |
|---|---|---|
| 0141208 | 9/1985 | European Pat. Off. |
| 3139823 | 5/1982 | Fed. Rep. of Germany |
| 1390497 | 1/1965 | France |
| 2449324 | 9/1980 | France |

*Primary Examiner*—Donald P. Walsh

*Attorney, Agent, or Firm*—Herbert L. Lerner; Laurence A. Greenberg

[57] ABSTRACT

A nuclear reactor fuel assembly for accommodating mutually parallel rods disposed side by side therein includes a spacer formed of two mutually parallel grid sections having sides, each of the grid sections including outer straps flatly facing the rods at which the grid sections are interconnected, each of the grid sections including main sleeves being positioned like positions of the same color in rows and columns disposed at right angles to each other on a chess board leaving a free intermediate position between each two occupied positions, the main sleeves dividing the grid sections into grid mesh openings at the positions each able to receive a respective rod therein, each main sleeve in one of the grid sections having edges and being aligned with a main sleeve in the other grid section forming pairs of main sleeves, connecting straps each interconnecting the main sleeves of a pair of main sleeves forming contact springs for rods, each of the connecting straps having a width being smaller than the circumference of one of the main sleeves, and spacer sleeves each being disposed between two of the main sleeves in one of the grid sections, each of the spacer sleeves including two spacer sleeve parts disposed at corresponding sides of the grid sections, and each of the spacer sleeve parts being disposed at a respective edge of two of the main sleeves.

25 Claims, 3 Drawing Sheets

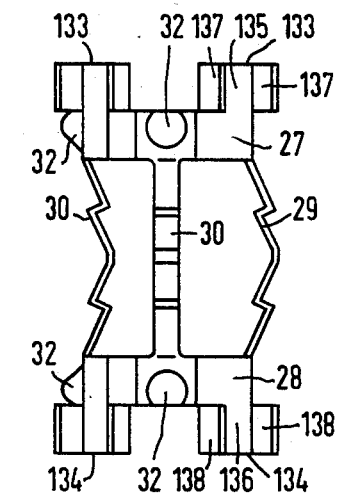
FIG 5
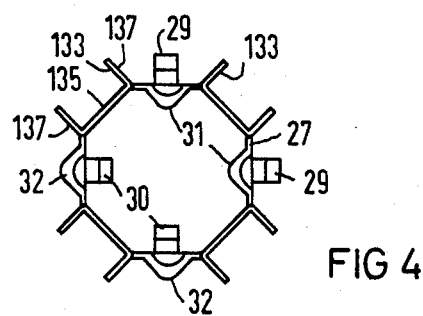
FIG 4
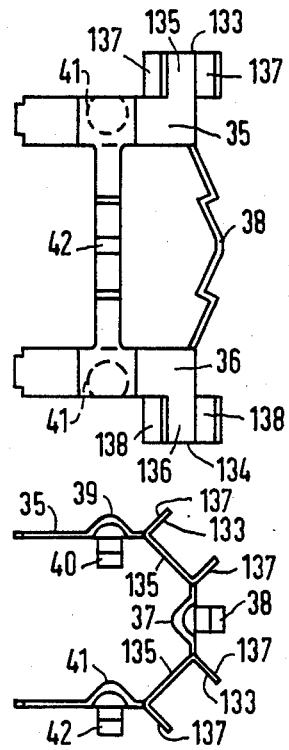
FIG 7
FIG 6
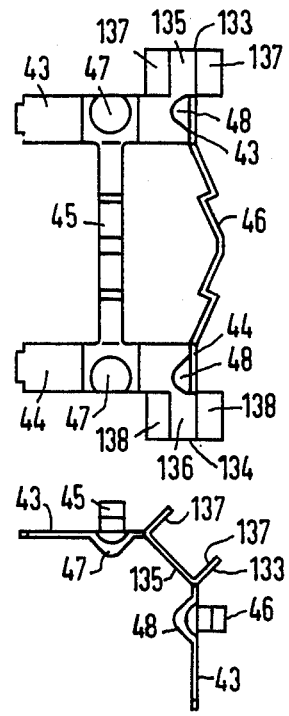
FIG 9
FIG 8

NUCLEAR REACTOR FUEL ASSEMBLY

The invention relates to a nuclear reactor fuel assembly for accommodating mutually parallel rods disposed side by side therein, comprising a spacer formed of two mutually parallel grid sections having sides, each of the grid sections including outer straps flatly facing the rods at which the grid sections are interconnected, each of the grid sections including main sleeves being positioned like positions of the same color in rows and columns disposed at right angles to each other on a chess board leaving a free intermediate position between each two occupied positions, the main sleeves dividing the grid sections into grid mesh openings at the positions each able to receive a respective rod therein, each main sleeve in one of the grid sections having edges and being aligned with a main sleeve in the other grid section forming pairs of main sleeves, connecting straps each interconnecting the main sleeves of a pair of main sleeves forming contact springs for rods, each of the connecting straps having a width being smaller than the circumference of one of the main sleeves, and spacer sleeves each being disposed between two of the main sleeves in one of the grid sections Such a nuclear reactor fuel assembly is described in German Published, Non-Prosecuted Application DE-OS No. 35 04 640.6 corresponding to U.S. application Ser. No. 827,289, filed Feb. 6, 1986. The spacer sleeve which is located in the spacer of the above-mentioned nuclear reactor fuel assembly in each grid section between two main sleeves is disposed as a separate part between the two main sleeves, resting against the main sleeves. The grid mesh openings of this spacer are congruently formed at the intermediate positions for grid mesh openings that are not occupied by the pairs of mutually-aligned main sleeves, by the adjoining pairs of main sleeves and the spacer sleeves, which has the effect of reducing the flow resistance of a coolant which flows lengthwise through the nuclear reactor fuel assembly in a nuclear reactor, as far as the spacer is concerned. However, the flow resistance in the spacer is still considerable.

It is accordingly an object of the invention to provide a nuclear reactor fuel assembly which overcomes the hereinafore-mentioned disadvantages of the heretofore-known devices of this general type and to reduce the flow resistance of the spacer even further.

With the foregoing and other objects in view there is provided, in accordance with the invention, a nuclear reactor fuel assembly for accommodating mutually parallel rods disposed side by side therein, comprising a spacer formed of two mutually parallel grid sections having sides, each of the grid sections including outer straps flatly facing the rods at which the grid sections are interconnected, each of the grid sections including main sleeves being positioned like positions of the same color in rows and columns disposed at right angles to each other on a chess board leaving a free intermediate position between each two occupied positions, the main sleeves dividing the grid sections into grid mesh openings at the positions each able to receive a respective rod therein, each main sleeve in one of the grid sections having edges and being aligned with a main sleeve in the other grid section forming pairs of main sleeves, connecting straps each interconnecting the main sleeves of a pair of main sleeves forming contact springs for rods, each of the connecting straps having a width being smaller than the circumference of one of the main sleeves, and spacer sleeves each being disposed between two of the main sleeves in one of the grid sections, each of the spacer sleeves including two spacer sleeve parts disposed at corresponding sides of the grid sections, and each of the spacer sleeve parts being disposed at a respective edge of two of the main sleeves.

In this way, the doubling of the amount of walls used in the spacers is avoided. For this reason, the cross section which is available in the spacer for the coolant, is increased. In addition, the form resistance coefficient of the spacer is improved by the spacer sleeve parts formed at the edges of the main sleeves. Both of these factors have a reducing effect on the flow resistance and therefore also decrease the pressure losses of a coolant flowing longitudinally through the nuclear reactor fuel assembly.

In accordance with another feature of the invention, each of the grid sections includes brackets occupying mesh opening positions and leaving a free intermediate position between each two occupied positions, each bracket in one grid section having edges and being aligned with a bracket in the other grid section forming pairs of brackets, each bracket having a U-shaped cross section defining two legs extending inward from one of the outer straps at right angles, additional connecting straps interconnecting the brackets of a pair of brackets, each additional connecting strap having a width being smaller than the circumference of one of the brackets forming contact springs for rods, and additional spacer sleeves each disposed between one respective main sleeve and one respective bracket in each of the grid sections, each of the additional spacer sleeves including two additional spacer sleeve parts disposed at corresponding sides of the grid sections, and each of the additional spacer sleeve parts being disposed at a respective edge of one of the main sleeves and at a respective edge of one of the brackets.

In accordance with an additional feature of the invention, the outer straps abut at a corner of the spacer, and each of the grid sections includes an angular part at the corner, each angular part in each grid section having edges and being aligned with an angular part in the other grid section forming pairs of angular parts, each angular part having an L-shaped cross section defining two legs extending inward from a different one of the outer straps at right angles, additional connecting straps interconnecting the angular parts of a pair of angular parts, each additional connecting strap having a width being smaller than the circumference of one of the angular parts forming contact springs for rods, and additional spacer sleeves each disposed between a respective main sleeve and a respective angular part, each of the additional spacer sleeves including two additional spacer sleeve parts disposed at corresponding sides of the grid sections, and each of the additional spacer sleeve parts being disposed at a respective edge of one of the main sleeves and at a respective edge of one of the angular parts.

In accordance with an added feature of the invention, the spacer sleeve parts or additional spacer sleeve parts of each spacer sleeve or of each additional spacer sleeve are welded together.

In accordance with a further feature of the invention, the spacer sleeves or additional spacer sleeves have a smaller cross section than the main sleeves.

In accordance with again another feature of the invention, the cross section of the spacer sleeves or additional spacer sleeves has a rectangular outer contour.

In accordance with again an added feature of the invention, the spacer has a square cross section and the outer straps are straight and elongated.

In accordance with again an additional feature of the invention, the cross section of the main sleeves has an at least substantially regular octogonal outer contour.

In accordance with again a further feature of the invention, the cross section of the spacer sleeves has a square contour with sides at least substantially equal in length to the length of a side of the octogonal contour of the main sleeves.

In accordance with still another feature of the invention, each spacer sleeve or additional spacer sleeve in one of the grid sections is aligned with a spacer sleeve or additional spacer sleeve in the other grid section forming pairs of spacer sleeves.

In accordance with still an added feature of the invention, the spacer sleeve pairs or additional spacer sleeve pairs include connecting straps having widths being smaller than the circumference of a spacer sleeve or additional spacer sleeve.

In accordance with again an additional feature of the invention, the spacer sleeves or additional spacer sleeves have longitudinal slots formed therein.

In accordance with a concomitant feature of the invention, the main sleeves have longitudinal slots formed therein.

These advantageous embodiments of the nuclear reactor fuel assembly according to the invention help to provide a production-friendly structure of the spacer, to decrease neutron absorption in particular and to even further decrease the flow resistance of the spacer.

Other features which are considered as characteristic for the invention are set forth in the appended claims.

Although the invention is illustrated and described herein as embodied in a nuclear reactor fuel assembly, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIGS. 4–9 alternatively show fragmentary, top-plan and side-elevational views of portions of the spacer according to FIGS. 2 and 3.

Figure 1:
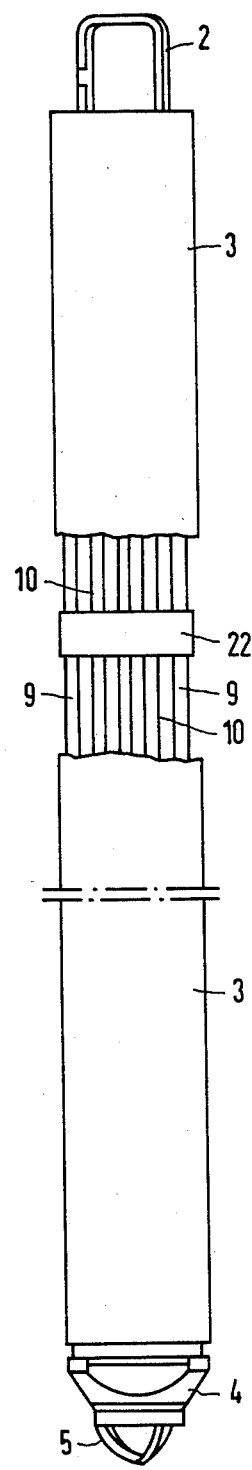
FIG. 1 is a diagrammatic, front-elevational view, partly broken away, of a nuclear reactor fuel assembly according to the invention.

Referring now to the drawings in detail and first, particularly to FIG. 1 thereof, there is seen a nuclear reactor fuel assembly intended for a boiling water nuclear reactor, including a fuel assembly head which is not shown in detail and a handle 2 on the top of a square grid plate. Two or four non-illustrated tie rods are disposed on top of the square grid plate. An enclosure box 3 formed of sheet metal rests on the tie rods and is associated with two or four non-illustrated cross strips which are also formed of sheet metal. The cross strips are attached to two or four inside corners at the upper end of the enclosure box 3. One of the cross strips is bolted to a respective tie rod. The enclosure box 3 has a square cross section and is open at both ends. The grid plate itself is provided with a multiplicity of flow passages disposed along the longitudinal direction of the nuclear reactor fuel assembly. Water in the reactor core of the boiling-water nuclear reactor flows through the passages. The grid plate is disposed at right angles to the longitudinal direction of the nuclear reactor fuel assembly.

The nuclear reactor fuel assembly according to FIG. 1 is furthermore provided with a fuel assembly base 4 which also has a non-illustrated covered square grid plate. This square grid plate also has a multiplicity of flow passages disposed along the longitudinal direction of the nuclear reactor fuel assembly for water in the reactor core of the boiling-water nuclear reactor. The grid plate at the lower surface of the fuel assembly base 4 is provided with a fitting element 5 which is open toward the grid plate and is inserted into a mesh opening of a so-called lower core grid located in the core of the boiling-water nuclear reactor.

The nuclear reactor fuel assembly according to FIG. 1 also includes a number of fuel rods which are constructed as support or mounting rods 9 for the head and the base 4 of the nuclear reactor fuel assembly and are filled with nuclear fuel. The mounting rods 9 are screwed into the grid plate of the fuel assembly base 4 and pass through the grid plate of the fuel assembly head where they are bolted to the grid plate by means of a nut located on the top of the grid plate. Other fuel rods 10 which are filled with nuclear fuel have ends that are inserted loosely into feedthroughs in the grid plates of the head part and the base part 4 of the nuclear reactor fuel assembly. Hold-down springs in the form of coil springs are mounted on the upper ends of the fuel rods and are braced against the fuel rod 10 on one hand and against the lower surface of the grid plate of the fuel assembly head on the other hand.

Finally, between the fuel assembly head and the fuel assembly base 4, the nuclear reactor fuel assembly according to FIG. 1 has several rectangular (in this case square) spacers which are aligned with the square grid plates of the head and the base 4. One such spacer 22 can be seen in FIG. 1. The other spacers are of the same construction as the spacer 22 but are covered by the enclosure box 3 associated with the fuel assembly, just as the grid plate of the head and the grid plate of the base 4 are covered and are, therefore, not visible in FIG. 1.

Figure 3:
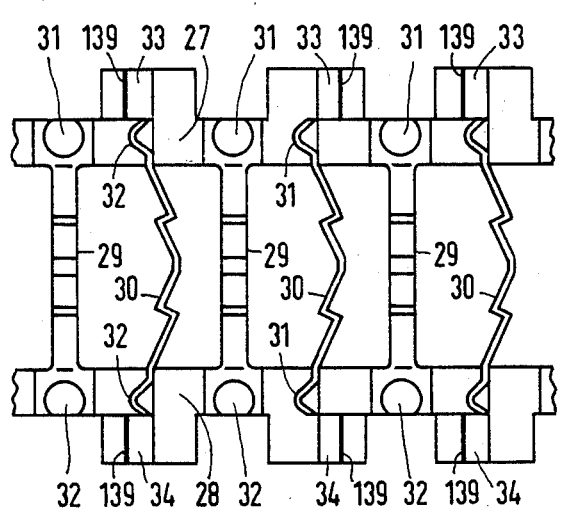
FIG. 3 is a fragmentary, longitudinal-sectional view taken along the line III—III in FIG. 2, in the direction of the arrows.
Figure 2:
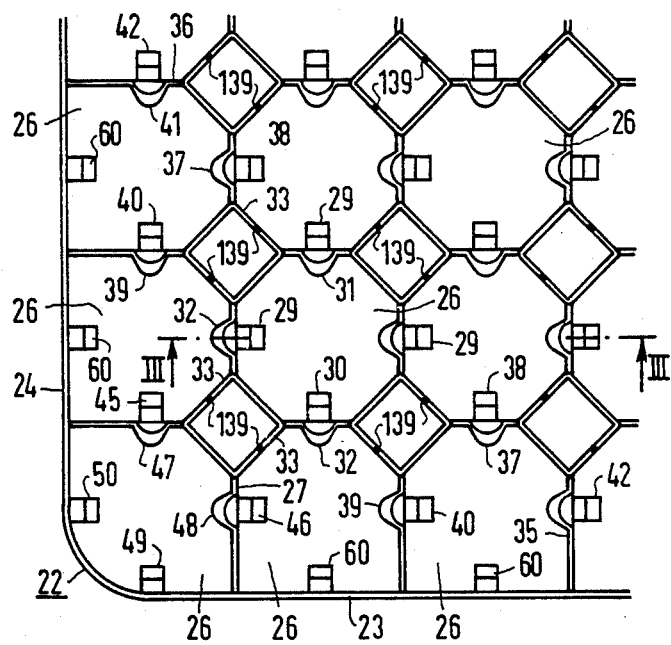
FIG. 2 is a fragmentary, top-plan view of a portion of a spacer of the nuclear reactor fuel assembly according to FIG. 1.

A spacer 22 shown in detail in FIGS. 2 and 3 is square and is formed of a nickel-chromium-iron alloy. Two flat, planar, outer straps 23 and 24 stand on edge and at right angles to each other, forming a rounded portion at the corners of the spacer 22. The spacer 22 furthermore has grid mesh openings or meshes 26 which are located in closely adjacent positions in rows and columns disposed at right angles to each other, like the spaces on a chessboard. Fuel rods of the nuclear reactor fuel assembly which contain nuclear fuel but are not shown in FIGS. 2 and 3 extend through the grid mesh openings 26. The outer straps 23 and 24 are disposed at right angles to the fuel rods and the fuel rods face these outer straps 23 and 24 flat. Such a fuel rod contains nuclear fuel in a hermetically sealed cladding tube formed of a zirconium alloy.

Pairs of mutually aligned main sleeves 27 and 28 which are shown in detail in FIGS. 4 and 5, are disposed within the outer straps 23 and 24 of the spacer 22 and have longitudinal axes in the spacer 22 which are parallel to each other and to the fuel rods, at the positions of the grid mesh openings 26 in rows and in columns at right angles to the rows like spaces of the same color on a chessboard, leaving a free intermediate position between two occupied positions.

As is shown particularly in FIGS. 4 and 5, the main sleeves 27 and 28 of each pair of sleeves of the spacer 22 have a cross section with an identical outer contour which is a regular octogon. Two sides of the octogonal outer contour of the main sleeves 27 and 28 which are parallel to the same outer strap 23 or 24, respectively, are provided with connecting straps 29 and 30 which overlap in a direction parallel to the longitudinal axes of the main sleeve pairs 27 and 28. The connecting straps 29 and 30 are disposed in the middle of a side of the regular octogon forming the outer contour of the cross section and have a width which is approximately equal to $\frac{1}{3}$ of the length of the side of the regular octogon. Each two connecting straps 29 and 30 located at mutually parallel sides of the octogon are arched in the middle thereof in the same direction, i.e., one connecting strap 29 is arched outward relative to the main sleeves 27 and 28 and one connecting strap 30 is arched inward relative to the main sleeves 27 and 28. In addition, respective rigid nubs or humps 31, 32 are disposed on the wall of the main sleeves 27 and 28 in the middle of the sides of the outer contour of the cross section forming the regular octogon. The rigid nub 31 points inward if the connecting strap 29 points outward with respect to a main sleeve 27 or 28, and the rigid nub 32 points outward if a connecting strap 30 points inward with respect to a main sleeve 27 or 28. In the spacer 22, pairs of mutually aligned spacer sleeves 33 and 34 are disposed diagonally between the main sleeves 27 and 28. The cross section of the spacer sleeves 33 and 34 is smaller than the cross section of the main sleeves 27 and 28 and may have a rectangular outer contour. In the illustrated embodiment, the outer contour of the spacer sleeves 33, 34 is a square, the side length of which is equal to the side length of the outer cross section of the main sleeves 27 and 28 forming a regular octogon. These spacer sleeves 33 and 34 are disposed between the main sleeves 27 and 28 and are each formed by two spacer sleeve parts 133 and 134, one of which is always formed at the outer edge of a main sleeve 27 or 28 on the side of the outer contour which is between the two sides with the connecting straps 29 and 30 and the nubs 31 and 32. Each spacer sleeve part 133 or 134 forms half a spacer sleeve having a spacer sleeve side 135 or 136 forming a part of a main sleeve 27 or 28, respectively, and two half spacer sleeve sides 137 or 138 mounted at the spacer sleeve side 135 or 136, respectively. The half spacer sleeve sides 137 and 138 of two adjoining main sleeves 27 and 28 are welded together at welding spots 139 and 140. The main sleeves 27 together with the spacer sleeves 33 formed thereon, form a first grid section of the spacer 22 and the main sleeves 28 together with the spacer sleeves 34 welded thereto, form a second grid section parallel to the first grid section. The spacer sleeves 33 and 34 are mounted on the outside of the grid sections.

According to FIGS. 6 and 7, a pair of mutually aligned brackets or straps 35, 36 formed of U-shaped straps flatly facing the non-illustrated fuel rods, are disposed at the positions of the grid mesh openings 26 in a row or column at an outer strap 23 and 24, leaving a free intermediate position between two occupied positions in the grid mesh openings 26. The brackets 35 and 36 have two legs which stand at right angles to the inside of the outer strap 23 or 24 in question. The brackets 35, 36 penetrate the outer straps 23, 24 with a tab, with which they are welded to the respective outer strap 23 or 24.

Between the two legs thereof, the brackets 35 and 36 have a cross section with an outer contour of half of a regular octogon which is congruent with the regular octogon forming the outer contour of the cross section of the main sleeves 27 and 28. In each of the two diagonal directions, each grid section of the spacer 22 has a spacer sleeve 33 and 34 with a cross section having an outer contour which may be a rectangle between two main sleeves 27 and 28 and a bracket 35 or 36, respectively. In the illustrated embodiment, the outer contour is a square with a side length which is equal to the side length of the regular octogon forming the outer contour of the cross section of the main sleeves 27 and 28. The mutually aligned spacer sleeves 33 and 34 are each formed by two spacer sleeve parts 133 and 134, one spacer sleeve part 133 or 134 of which is formed at the outer edge of the main sleeves 27 or 28 at the side of the outer contour between two sides with the connecting straps 29 and 30 and nubs 31 or 32, respectively. The other spacer sleeve part 133 or 134 is formed at the outer edge of the bracket 35 or 36, respectively, between two sides with connecting straps 38 or 40 as well as 38 or 42, respectively, and nubs 37 or 39 as well as 37 or 41, respectively.

Each spacer sleeve part 133 or 134 is half of a spacer sleeve with a spacer sleeve side 135 or 136 forming a part of the main sleeves 27 or 28 or the bracket 35 or 36 and two half spacer sleeve sides 137 or 138 mounted at the spacer sleeve side 135 or 136. The half spacer sleeve sides 137 and 138 of the main sleeves 27, 28 and the adjacent brackets 35 and 36 are welded together at welding spots 139 and 140, respectively. Between the outer edges of the brackets to which the spacer sleeve parts are mounted, the brackets 35 and 36 are each parallel to the respective outer strap 23 or 24, to which they are welded. In the middle of the portion of the brackets which are welded to the outer straps, each bracket has a rigid nub 37 pointing inward relative to the bracket 35 or 36. A connecting strap 38 is further formed at the location of the nub 37 between the two brackets 35 and 36, the width of which is approximately equal to $\frac{1}{3}$ of the side length of the regular octogon forming the outer contour of the cross section of the main sleeves 27 and 28 which is arched outward relative to the brackets 35 and 36 and which forms a contact spring for a non-illustrated fuel rod in a grid mesh opening 26. In addition, one leg of the brackets 35 and 36 has a nub 39 pointing outward with respect to the bracket in question. A connecting strap 40 with the same width as the connecting strap 38 is also formed at the same point, is arched inward relative to the two brackets 35 and 36 and forms a contact spring for a non-illustrated rod in a grid mesh opening 26. A rigid nub 41 pointing inward relative to the brackets 35 and 36 is disposed at the other leg of the brackets 35 and 36. At the same point, a connecting strap 42 with the same width as the connecting strap 38, is formed between the brackets 35 and 36 and is arched outward with respect to the two brackets 35 and 36, likewise forming a contact spring for a non-illustrated fuel rod in a grid mesh opening 26.

According to FIGS. 8 and 9, a pair of mutually-aligned angular parts 43, 44 are disposed between the two outside straps 23 and 24 which meet each other at right angles in a corner of the spacer 22.

The angular parts are straps with an L-shaped cross section flatly facing the fuel rods. The angular parts 43 and 44 have two legs which stand at right angles on the inside of another of the two outer straps 23 and 24. The angular parts 43, 44 extend through the outer straps 23, 24 with a tab, with which they are welded at the respective outer strap.

Between the two legs thereof, the angular parts 43 and 44 have a cross section with an outer contour which is equal to one-quarter of the regular octogon which is the outer contour of the cross section of the main sleeves 27 and 28. In each of the two mutually parallel grid sections of the spacer 22, a respective sleeve 33 or 34 is disposed between a main sleeve 27 or 28 and an angular part 43 or 44. The spacer sleeves 33 and 34 have a cross section which may have the outer contour of a rectangle. In the illustrated embodiment, the outer contour is a square with a side length equal to the side length of the regular octogon forming the outer contour of the cross section of the main sleeves 27 and 28. The mutually aligned spacer sleeves 33 and 34 are each formed by two spacer sleeve parts 133 and 134, one spacer sleeve part 133 or 134 of which is formed at the outer edge of the main sleeve 27 or 28 on the side of the outer contour between two sides with connecting straps 29, 30 and nubs 31 or 32, respectively. The other spacer sleeve part 133 or 134 is formed at the outer edge of the angular part 43 or 44. Each spacer sleeve part 133, 134 is half a spacer sleeve side 135 or 136 forming a part of the main sleeve 27 or 28 or a part of the angular part 43 or 44 and two half spacer sleeve sides 137 or 138 mounted at the spacer sleeve side 135 or 136. The half spacer sleeve sides 137, 138 of the main sleeve 27 or 28 and an adjacent angular part 43, 44 are welded together at welding spots 139 and 140. The straps of the angular parts 43 and 44 flatly face the non-illustrated fuel rods in the spacer 22.

On both sides of the transition to the spacer sleeve parts 133, 134, a connecting strap 45, 46 is formed at the legs of the angular parts 43 and 44. The width of the two connecting straps 45 and 46 is approximately equal to ⅓ of the side length of the regular octogon representing the outer contour of the cross section of the main sleeves 27 and 28. Both connecting straps 45 and 46 are arched outward with respect to the angular parts 43 and 44 and form contact springs for a non-illustrated fuel rod in a grid mesh opening 26. The legs of the angular parts 43 and 44 each have a rigid nub 47, 48 facing inward with respect to the angular parts 43 and 44, at the points where the connecting straps 45 and 46 are formed. Straps 49 and 50 are formed opposite the two rigid nubs 47 and 48 on the inside of the outer straps 23 and 24 and are arched inward with respect to the outer straps 23 and 24, forming contact springs for a non-illustrated fuel rod in the grid mesh opening 26 in the respective corner of the spacer 22. Similarly, straps 60 are inwardly arched (with respect to the outer straps 23 and 24) forming contact springs at the outer straps 23 and 24 opposite the rigid nubs 32 and 37 at the main sleeves 27 and 28 or at the brackets 35 and 36, which overlap in a direction parallel to the longitudinal axes of the pairs of main sleeves 27 and 28.

Whereas the spacer sleeves 33, 34 between two main sleeves are simply referred to as spacer sleeves, the spacer sleeves 33, 34 between two main sleeves and a bracket as well as the spacer sleeves 33, 34 between a main sleeve and an angular part, may be referred to as additional spacer sleeves.

The grid mesh openings 26 of the spacer 22 are either formed of U-shaped straps by the interior of the main sleeves 27, 28 or by the interior of the brackets 35, 36 or they are formed of L-shaped straps by the interior of the angular parts 43 and 44 or they are formed by the space between spacer sleeves 33 and 34 and main sleeves 27, 28 or the brackets 35 and 36 with U-shaped straps or the angular parts 43 and 44 with L-shaped straps. In any case, a non-illustrated fuel rod always has two elastic three-point supports in the mesh openings which offer little flow resistance to a coolant flowing in the longitudinal direction of the nuclear reactor fuel assembly.

The spacer sleeves 33 and 34 which are aligned in pairs, may also have non-illustrated connecting straps on the sides of their outer contour, having a width which is smaller than the circumference of the spacer sleeves. The spacer sleeves 33 and 34 may also have a longitudinal slot for reducing the amount of material needed for construction. The main sleeves 27 and 28 may also be provided with a longitudinal slot.

The nuclear reactor fuel assembly according to the invention, especially with a spacer according to FIGS. 2 to 9, may also be a nuclear reactor fuel assembly for a pressurized-water nuclear reactor. The grid mesh openings 26 of the spacer 22 in such a nuclear reactor fuel assembly, contain not only fuel rods containing nuclear fuel, but also control rod guide tubes which have one end detachably fastened to a head plate of a head and another end detachably fastened to a base plate of a base of the nuclear reactor fuel assembly, such as by a screw connection. The control rod guide tubes extend through the head and base plates at right angles. The head and base plates may likewise be square. The fuel rods extending through one of the mesh openings 26 of the spacer 22 are fastened neither to the head plate nor to the base plate of the nuclear reactor fuel assembly, but instead they have play between the head and the base in the longitudinal direction and can therefore expand freely in the direction of their longitudinal axes, i.e. in the longitudinal direction of the nuclear reactor fuel assembly.

I claim:

1. Nuclear reactor fuel assembly for accommodating mutually parallel rods disposed side by side therein, comprising a spacer formed of two mutually parallel grid sections having sides, each of said grid sections including outer straps flatly facing the rods at which said grid sections are interconnected, each of said grid sections including main sleeves being positioned like positions of the same color in rows and columns disposed at right angles to each other on a chess board leaving a free intermediate position between each two occupied positions, said main sleeves dividing said grid sections into grid mesh openings at said positions each able to receive a respective rod therein, each main sleeve in one of said grid sections having edges and being aligned with a main sleeve in the other grid section forming pairs of main sleeves, connecting straps each interconnecting said main sleeves of a pair of main sleeves forming contact springs for rods, each of said connecting straps having a width being smaller than the circumference of one of said main sleeves, and spacer sleeves each being disposed between two of said main sleeves in one of said grid sections, each of said spacer sleeves including two spacer sleeve parts disposed at corresponding sides of said grid sections, and each of said spacer sleeve parts being disposed at a respective edge of two of said main sleeves.

2. Nuclear reactor fuel assembly according to claim 1, wherein each of said grid sections includes brackets occupying mesh opening positions and leaving a free intermediate position between each two occupied positions, each bracket in one grid section having edges and being aligned with a bracket in the other grid section forming pairs of brackets, each bracket having a U-shaped cross section defining two legs extending inward from one of said outer straps at right angles, additional connecting straps interconnecting said brackets of a pair of brackets, each additional connecting strap having a width being smaller than the circumference of one of said brackets forming contact springs for rods, and additional spacer sleeves each disposed between one respective main sleeve and one respective bracket in each of said grid sections, each of said additional spacer sleeves including two additional spacer sleeve parts disposed at corresponding sides of said grid sections, and each of said additional spacer sleeve parts being disposed at a respective edge of one of said main sleeves and at a respective edge of one of said brackets.

3. Nuclear reactor fuel assembly according to claim 1, wherein said outer straps abut at a corner of said spacer, and each of said grid sections includes an angular part at said corner, each angular part in each grid section having edges and being aligned with an angular part in the other grid section forming pairs of angular parts, each angular part having an L-shaped cross section defining two legs extending inward from a different one of said outer straps at right angles, additional connecting straps interconnecting said angular parts of a pair of angular parts, each additional connecting strap having a width being smaller than the circumference of one of said angular parts forming contact springs for rods, and additional spacer sleeves each disposed between a respective main sleeve and a respective angular part, each of said additional spacer sleeves including two additional spacer sleeve parts disposed at corresponding sides of said grid sections, and each of said additional spacer sleeve parts being disposed at a respective edge of one of said main sleeves and at a respective edge of one of said angular parts.

4. Nuclear reactor fuel assembly according to claim 1, wherein said spacer sleeve parts of each spacer sleeve are welded together.

5. Nuclear reactor fuel assembly according to claim 2, wherein said additional spacer sleeve parts of each additional spacer sleeve are welded together.

6. Nuclear reactor fuel assembly according to claim 3, wherein said additional spacer sleeve parts of each additional spacer sleeve are welded together.

7. Nuclear reactor fuel assembly according to claim 1, wherein said spacer sleeves have a smaller cross section than said main sleeves.

8. Nuclear reactor fuel assembly according to claim 2, wherein said additional spacer sleeves have a smaller cross section than said main sleeves.

9. Nuclear reactor fuel assembly according to claim 3, wherein said additional spacer sleeves have a smaller cross section than said main sleeves.

10. Nuclear reactor fuel assembly according to claim 1, wherein the cross section of said spacer sleeves has a rectangular outer contour.

11. Nuclear reactor fuel assembly according to claim 2, wherein the cross section of said additional spacer sleeves has a rectangular outer contour.

12. Nuclear reactor fuel assembly according to claim 3, wherein the cross section of said additional spacer sleeves has a rectangular outer contour.

13. Nuclear reactor fuel assembly according to claim 1, wherein said spacer has a square cross section and said outer straps are straight and elongated.

14. Nuclear reactor fuel assembly according to claim 1, wherein the cross section of said main sleeves has an at least substantially regular octogonal outer contour.

15. Nuclear reactor fuel assembly according to claim 14, wherein the cross section of said spacer sleeves has a square contour with sides at least substantially equal in length to the length of a side of the octogonal contour of said main sleeves.

16. Nuclear reactor fuel assembly according to claim 1, wherein each spacer sleeve in one of said grid sections is aligned with a spacer sleeve in the other grid section forming pairs of spacer sleeves.

17. Nuclear reactor fuel assembly according to claim 2, wherein each additional spacer sleeve in one of said grid sections is aligned with an additional spacer sleeve in the other grid section forming pairs of spacer sleeves.

18. Nuclear reactor fuel assembly according to claim 3, wherein each additional spacer sleeve in one of said grid sections is aligned with an additional spacer sleeve in the other grid section forming pairs of spacer sleeves.

19. Nuclear reactor fuel assembly according to claim 16, wherein said spacer sleeve pairs include connecting straps having widths being smaller than the circumference of a spacer sleeve.

20. Nuclear reactor fuel assembly according to claim 17, wherein said additional spacer sleeve pairs include connecting straps having widths being smaller than the circumference of an additional spacer sleeve.

21. Nuclear reactor fuel assembly according to claim 18, wherein said additional spacer sleeve pairs include connecting straps having widths being smaller than the circumference of an additional spacer sleeve.

22. Nuclear reactor fuel assembly according to claim 1, wherein said spacer sleeves have longitudinal slots formed therein.

23. Nuclear reactor fuel assembly according to claim 2, wherein said additional spacer sleeves have longitudinal slots formed therein.

24. Nuclear reactor fuel assembly according to claim 3, wherein said additional spacer sleeves have longitudinal slots formed therein.

25. Nuclear reactor fuel assembly according to claim 1, wherein said main sleeves have longitudinal slots formed therein.

* * * * *